United States Patent Office 2,905,250
Patented Sept. 22, 1959

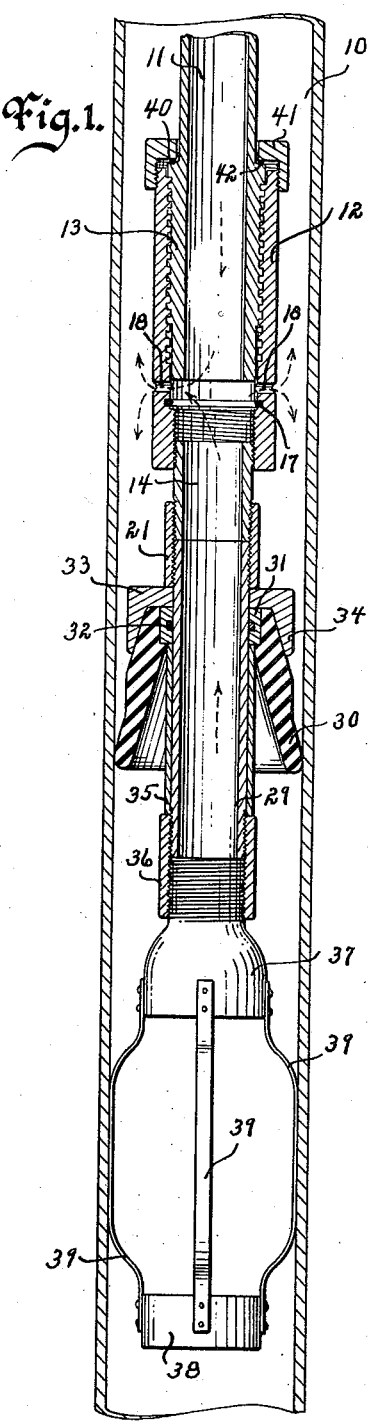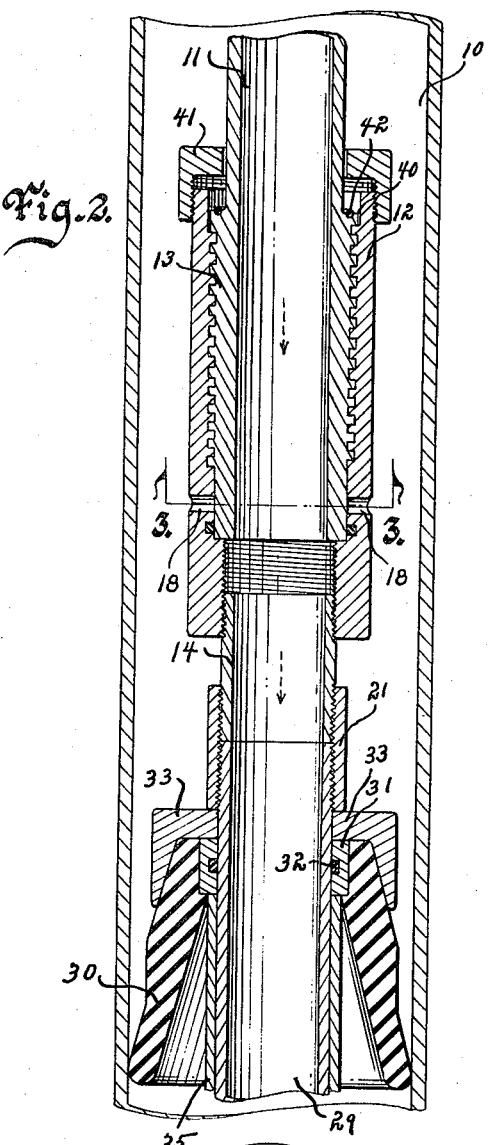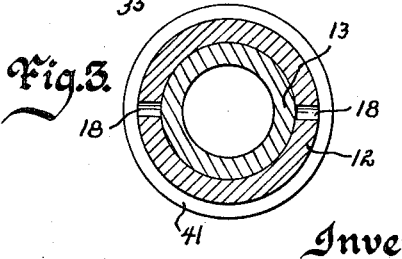

2,905,250

WELL PIPE BYPASS VALVE

William G. Talbott, Wichita, Kans.

Application April 2, 1956, Serial No. 575,500

2 Claims. (Cl. 166—226)

This invention relates to well treating devices and more particularly to a fluid bypass means for use with tubular pipes extending into oil, gas and like wells.

In the drilling and treating of drilled wells much equipment and even the well itself may become lost by the equipment being accidentally covered or clogged by foreign matter, such as sand. This is particularly true of packers, drills, pump means and like. The treatment of petroleum wells by acid or fracturing fluids under great pressures requires rigid locking packers such as disclosed in my application for United States Letters Patent on a Packer For Use in Oil Wells and Like, filed January 27, 1956, Serial No. 561,828, now Patent No. 2,841,225, and which had incorporated in its mechanism a fluid bypass. However, there are many instances where it is desired that a bypass means be incorporated at different locations in a given pipe length and not of a temporary character as indicated in the above designated application. As a matter of fact, many non-locking packers are placed in a casing and left for long periods of time. Even with locking type packers it might be desirable to provide bypass or valve means at considerable distance from the packer. Another case in point is where there may be two pay zones and it is desirable to separate but also communicate with both. Regardless of the character of the tools used, it does often become necessary to provide a bypass or valve in the pipe rod holding the tool.

Therefore, one of the principal objects of my invention is to provide a valve or bypass within the length of a pipe that is always under the complete control of the workman on the ground surface.

Further objects of this invention are to provide a well pipe bypass valve means that is economical in manufacture, and durable in use.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a longitudinal sectional view of my bpyass valve means in closed condition, Fig. 2 is an enlarged longitudinal sectional view of the device in opened arrangement, and Fig. 3 is a cross sectional view taken on line 3—3 of Fig. 2.

In these drawings I have used the numeral 10 to designate a well casing such as would be in a drilled well. There is the usual pipe (not shown) detachably extending downwardly in the casing, to support drilling tools, or pump means, or a packer, or it may be used as a conduit for liquids or gases moving in either direction. My device is threaded and fixed onto such a pipe by any suitable means. The numeral 11 designates a pipe portion adapted to be secured to the above mentioned well pipe, or it can even be the lower continuation of such a pipe. The numeral 12 designates a barrel having internal box threads. The numeral 13 designates an elongated pipe head portion secured to or integrally formed on the bottom end of the pipe 11, as shown in Fig. 1. This head 13 is embraced by the barrel 12 and its box threads are threaded into the internal box threads of the barrel as shown in Fig. 2. The head portion 13 is of a diameter greater than that of the diameter of the pipe 11 to provide a shoulder 40 to take an O-ring 42. The numeral 41 designates a collar nut embracing the pipe 11, and shoulder 40. This nut is threaded onto the upper end of the barrel, thus preventing the complete withdrawal of the head 13 from the barrel 12. The lower inner end portion of the barrel 12 is without threads as shown in Fig. 1. Below the box threaded areas of both the members 12 and 13 are lateral passageways 18 extending through the wall of the member 12. Directly below these passageways is a grooved O-ring 17 imbedded in and embracing the member 13 when that member is in lowered position and seal engaging the inside of the barrel 12 below its box threads. Thus if the part 14, which is threaded into the lower end of the barrel, is held and the pipe 11 rotated in one direction, the barrel 12 will be raised relative to the part 13 thereby bringing the open bottom of the head 13 above the passageways 18 and the sealing ring 17, as shown in Fig. 1. By rotating the pipe 11 (which may be done from the ground surface) in the other direction the barrel 12 will be lowered relative to the part 13 and the passageways 18 be closed by the lower end portion of the head 13 and which will pass to positions below the O-ring thereby closing any communication between the casing 10 and pipe 11 above the packer 30.

Any suitable clutch drag may be used to hold the part 14 against rotation. In the drawings I show a simple one way packer unit imposed between the neck 14 and the clutch drag. Any number of these packers may be employed and they may be arranged for holding fluids in either or both directions and located above and/or below the bypass valve means herebefore described. The packer valve per se is designated by the numeral 30 and is hollow cone shape and made of suitable flexible resilient waterproof material, such as rubber composition. On the inner top of the member 30 is a metallic collar 31 carrying an O-ring 32. Above each member 30 is a metallic washer 33 having a rim skirt 34 embracing the upper portion of the member 30, as shown in Fig. 2.

The pipe 29 is secured to the end of the neck portion 14 by a threaded collar 21. The numeral 35 designates a spacer pipe on the pipe 29 between the packer and threaded sleeve 36 for holding the packer unit up against the threaded sleeve collar 21. In the drawings I show a cage type clutch drive having a top portion 37 threaded into the collar 36, a lower portion 38, and spring rib lengths 39 extending between the members 37 and 38. These spring ribs yieldingly engage the inside of the casing 10 and thereby yieldingly resist rotation within the casing.

The practical operation of the device is as follows:
The device is imposed in or placed on the end of the well pipe and lowered into the well casing 10. The barrel 12 will have been rotated relative to the pipe head 13 to place the head 13 below the passageways 18 and below the O-ring 17, and as shown in Fig. 2. Fluid may be passed in either direction through the pipe 11. Also the space between the outside of the pipe 11 and inside of the casing is also an available conduit. The direction of flow in the casing has herebefore been limited to the direction of the one way packer 30. Assuming that sand were to foul the vicinity above the packer, the pipe 11 is rotated to bring the head 13 above the passageways 18 and above the O-ring 17. A sand washing liquid could be forced through the pipe 11, through the passageways 18 and thence into the casing above the packer. This solution with the unwanted sand passes upwardly through the casing 10 to the ground surface. Or if desired the liquid may be passed downwardly through the casing, thence through the passageways 18 into the pipe 11 wherein it may flow upwardly.

Another operation would be to seal the top of the casing, force fluid downwardly through the pipe 11, and through the passageways 18 and downwardly past the one way valve 30. To close the passageways 18 from communication with the inside of the pipe 11 above the packer, the pipe 11 is rotated in the other direction to locate the passageways 18 above the lower end of the head 13 and with the end of the head 13 inside the O-ring 17, as shown in Fig. 2.

From the above description it is obvious that there are many possible arrangements of the parts of my device to meet many and varied needs in the treatment of wells.

Some changes may be made in the construction and arrangement of my well pipe bypass valve without departing from the real spirit and purpose of my invention, and it is my intention to cover by my claims, any modified forms of structure or use of mechanical equivalents which may be reasonably included within their scope.

I claim:

1. In a device of the class described, a barrel member open at both its ends, a tubular member open at both ends having one end portion extending inside said barrel member terminating inside said barrel member, and having a portion of its length threaded onto an internal portion of said barrel member, an O-ring sealer in said barrel member and embracing said tubular member only when said tubular member is threaded downwardly in said barrel member, a passageway through the wall of said barrel member and located below said tubular member when said tubular member is elevated relative to said barrel member, a one-way packer, a friction drag unit, and means operatively connecting said one-way packer and friction drag unit to said barrel.

2. In a device of the class described, a barrel member open at both its ends, a tubular member open at both ends having one end portion extending inside said barrel member terminating inside said barrel member, and having a portion of its length threaded onto an internal portion of said barrel member, an O-ring sealer in said barrel member and embracing said tubular member only when said tubular member is threaded downwardly in said barrel member, a passageway through the wall of said barrel member and located below said tubular member when said tubular member is elevated relative to said barrel member, a one-way packer, a friction drag unit, means operatively connecting said one-way packer and friction drag unit to said barrel, and a stop means on said barrel member for preventing the complete unthreading of said tubular member from said barrel member.

References Cited in the file of this patent

UNITED STATES PATENTS

| | | |
|---|---|---|
| 2,037,896 | Haines | Apr. 21, 1936 |
| 2,360,311 | Ausburn et al. | Oct. 11, 1944 |
| 2,379,079 | Hayward | June 26, 1945 |
| 2,569,732 | Ragan | Oct. 2, 1951 |
| 2,577,068 | Baker | Dec. 4, 1951 |